June 28, 1966  J. R. BUSS ETAL  3,258,063
HEAT RECOVERY PROCESS
Filed Jan. 2, 1964
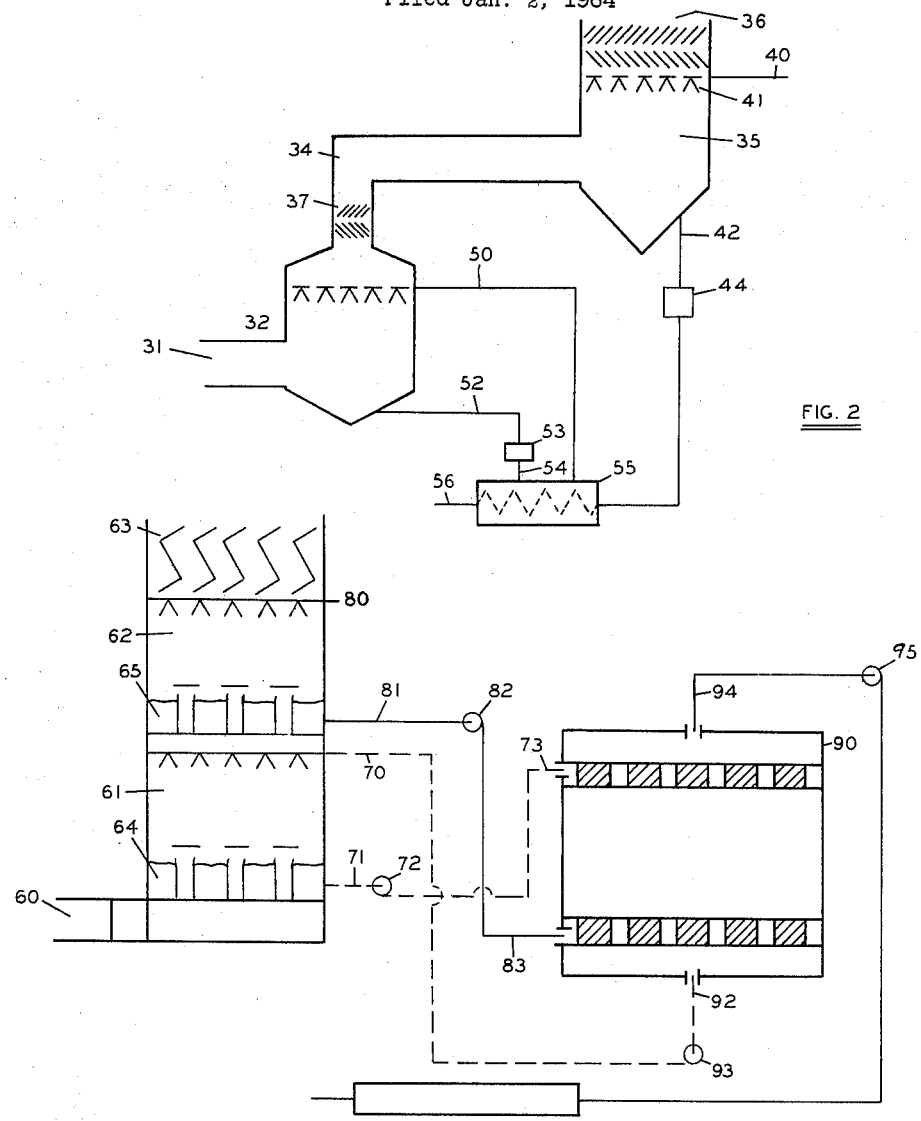
FIG. 2
FIG. 3
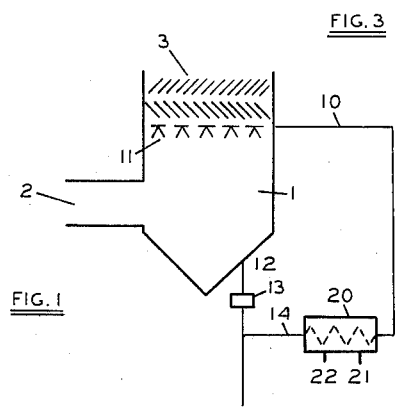
FIG. 1
INVENTORS
JOHN R. BUSS
MALCOLM McEWEN
BY Herman O. Bauermeister
ATTORNEY …

3,258,063
HEAT RECOVERY PROCESS
John R. Buss and Malcolm McEwen, St. Louis, Mo., assignors to Monsanto Company, a corporation of Delaware
Filed Jan. 2, 1964, Ser. No. 335,036
4 Claims. (Cl. 165—1)

The present invention relates to an improvement in recovery of waste heat from high temperature exhaust gas streams such as boiler stack gases. It has long been recognized in the operation of boilers both for the production of process steam and in power production, as well as in the operation of internal combustion engines that a large proportion, e.g., as much as 25% of the heat of combustion cannot economically be recovered since such heat is lost as sensible and latent heat of the gaseous products of combustion which leave the boiler through the stack or chimney.

It is the object of the invention to improve the thermal efficiency of plant systems such as boilers and diesel engines by recovering a larger portion of the heat which would otherwise be lost as sensible and latent heat leaving the boiler stack or engine exhaust. It is a further object of the invention to employ a specific group of polyphenyl ether compounds as heat recovery media in carrying out the objects of the invention.

The present invention departs from the prior art in employing a specific organic chemical composition for direct contact with the hot gas stream for the recovery of heat. The organic compositions which are employed in the practice of the present invention are the polyphenyl ethers, of the group having from 4 to 6 benzene rings joined by oxygen ether linkages such as bis(p-phenoxyphenyl)ether; m-phenoxylphenyl, p-phenoxyphenyl ether; o-phenoxyphenyl, p-phenoxyphenyl ether; bis(m-phenoxyphenyl) ether; bis(o-phenoxyphenyl)ether; o-phenoxyphenyl, m-phenoxyphenyl ether; bis-p-(p-phenoxyphenoxy)benzene; bis-m-(m-phenoxyphenoxy)benzene; bis-o-(o-phenoxyphenoxy)benzene; p-bis(m-phenoxyphenoxy)benzene; bis[p-(m-phenoxyphenoxy)phenyl]ether; and bis-phenoxy biphenyl and isomers thereof. The oxygen bridges may join phenyl radicals, and also a pair of phenyl radicals, e.g., the biphenyl group which in the present compounds has 2 oxygen ether atoms joining further phenyl or biphenyl radicals. These compounds are the essential components employed in the present invention, so that at least one of the polyphenyl ethers of 4 to 6 phenyl radicals must be present. However, various technical mixtures are sometimes used to obtain a particular viscosity or vapor pressure relationship, and minor amounts of diluent fluids may also be used. The above described synthetic organic compound are essential components of the working fluid. Adjunct materials which can be added to reduce volatility, control viscosity, vapor pressure, as well as specific problems arising in various installations with respect to foaming or emulsion formation include silicones, aryl silanes and various aryl phosphorus compounds such as triphenyl phosphate.

The above working materials employed in practicing the present invention are characterized by chemical inertness, fire resistance and low vapor pressure. The present class of compounds have been found to be far superior to hydrocarbons such as oils, because of the oxidative stability characteristic of the ether molecular structure. Furthermore, the present group of materials has a density greater than that of water, so that, as described herein a phase separation from water is possible. While not critical, it has been found desirable to employ materials having a vapor pressure less than about 0.1 mm. at 100° C.

Essentially, the present invention comprises the recovery of heat from hot gases by heat exchange with the present group of working compounds. Because of the stability of these compounds they can be directly contacted with the hot gases such as by spraying droplets of the compounds down into a tower in which the hot gases are flowing upward. Thus, gases can be used at 300° F. to 1000° F. or more as obtained from a boiler, gas turbine or from a diesel engine. This direct contact step increases the temperature and heat content of the synthetic organic compound, and can also result in some condensation of water from the water vapor content of combustion gases, thereby also adding further heat to the working medium.

After the organic compound has been increased in heat content, it is used for heat exchange. In one embodiment of the invention, the working medium is used in an indirect heat exchanger, e.g., such as in a shell and tube heat exchanger to heat feedwater or a process stream. Another embodiment is to use direct heat exchange such as in mixing the organic liquid and a heat acceptor liquid such as water or other inert liquid in a vessel. For example the organic medium is passed downward through a large tank while feedwater is introduced at the lower portion. The use of distribution nozzles and a settling section permits easy seperation because of the high density of the organic working liquid.

After the heat content of the organic compound has been recovered, this compound is recycled to the heat pickup step. The feedwater is withdrawn and used in a boiler or for process use, etc. Instead of using a single contacting stage, a number of stages may also be employed in order to improve the efficiency.

The polyphenyl ethers of the present invention are particularly useful in the present process since, in the specific range of compositions set forth herein, these working materials are completely fire resistant so that they may be employed in installations where fire hazards my be present. Another advantage which has been found to be characteristic of the present group of polyphenyl ether compounds is their high density. This is advantageous in the separation of water. Accordingly, the present materials are readily separated as an organic liquid phase from the aqueous phase. The above ether compounds are also characterized by exceedingly good high temperature stability. The properties of these materials, i.e., their chemical composition, consisting only of carbon, hydrogen, and ether oxygen and high thermal stability make possible the operation of recovery units with these materials at temperatures as high as 425° C. or higher for extended periods of time.

The direct-contacting heat transfer media employed in the practice of the present invention are of special utility because of their high thermal stability so that gases at unusually high temperatures can readily be employed for heat recovery. Furthermore, the presence of sulfur dioxide and sulfur trioxide in the gases undergoing treatment does not cause deterioration or breakdown of the working fluid. In addition, the cycling of the medium through heat exchangers, or in direct contact with other liquids such as water for heat exchange does not cause significant decomposition of the present organic working media. Thus, the difficulties of prior art systems in attempting to operate at high temperatures are to a considerable degree overcome by the present process.

There are specific situations in the recovery of heat from large volumes of gases, for example in working with the flue gases from large power plants, where a multistage heat recovery system is desirable. In such situations, a two stage system or higher number of units may be employed with the present synthetic organic compound being employed in one or more of such stages. Another embodiment of the invention is to employ the present high thermal stability material in the primary stage in which gases of highest temperature are directly contacted, and to use another inert fluid such as water as the liquid medium in the second or additional stages. Examples of these modifications are shown in the drawings and examples forming a part of the present patent application.

In the drawings of the present application, FIGURE 1 shows a single stage heat recovery system using the organic compounds described above as the heat recovery medium. FIGURE 2 illustrates a heat recovery system employing two working fluids and with indirect heat exchange in the heat recovery portion of the cycle. FIGURE 3 shows another two stage heat recovery system employing direct contact of two working fluids for heat recovery.

In FIGURE 1 a direct-contact heat recovery system is shown employing a single stage unit, although multistage contactors can similarly be employed. In FIGURE 1, element 1, is a countercurrent contacting tower in which the high thermal energy gases from which heat is to be recovered in tower 1, enter through duct 2 passing upwardly through the tower to emerge through exit 3. In countercurrent flow to the gas stream, a falling stream of droplets of the synthetic organic heat transfer medium described above enters tower 1 by way of line 10 to be dispersed by means of distributor nozzles 11. The falling stream of the medium collects at the bottom of tower 1 and is withdrawn by line 12, passing through a filter 13, which may also have a water separator combined therewith. The hot medium enters heat exchanger 20 by means of line 14. After the medium has given up its available energy, it is recycled by line 10 to contactor 1. The heat acceptor fluid such as boiler feedwater enters heat exchanger 20 by line 21 and leaves by line 22.

As an example of the operation of the present heat exchange system, a boiler flue gas enters tower 1 above at the rate of 275,000 lb. per hour at a temperature of 380° F. The working medium, bis-phenoxy biphenyl, is passed into the tower at the rate of 233,000 lb. per hour with an incoming temperature of 130° F. The gas stream leaving the tower is at a temperature of 135° F. while the medium leaving at the bottom of the countercurrent contacting tower is at a temperature of 330° F. The heat acceptor fluid used in the indirect heat exchanger at a stream flow of 222,000 lb. per hour of feedwater enters at 50° F. and leaves the heat exchanger at 123° F.

Analysis of the heat recovery in the above heat system shows an improvement corresponding to an increase of 7% in the net steam output from the boiler plant for the same amount of fuel consumed. For the same net boiler plant steam output as the conventional system, a reduction in fuel consumption of 6.5% is achieved.

In FIGURE 2 a two liquid heat exchange system is employed. In FIGURE 2 the boiler flue gases 31 are introduced through duct 32 into the high temperature contacting tower 33. The gases pass upward through this tower through duct 34 containing a de-entrainer 37 and then enters the low temperature tower 35. In tower 35 the gases again pass upward and leave the tower through de-entrainer 36. In the dual fluid heat recovery system of FIGURE 2, the heat recovery medium in the low temperature tower is the incoming water stream entering through line 40 and being dispersed through nozzles 41 to pass countercurrent through flue gases to the bottom of tower 35 and to be withdrawn through line 42 which is also provided with an organic-phase separator 44. The higher temperature loop employs a polyphenyl ether compound, a suitable type being bis-phenoxy biphenyl. The bis-phenoxy biphenyl enters tower 33 through line 50, and is dispersed as droplets by nozzles 51. The droplets pass countercurrent to the flue gas and are collected at the bottom of tower 33 to leave by way of line 52. The bis-phenoxy biphenyl stream then passes through a filter 53. The stream of bis-phenoxy biphenyl goes through line 54 to enter heat exchanger 55 and is thereafter recycled through line 50. The recovery of the higher temperature heat from this loop of the recovery system is carried out in heat exchanger 55 which receives the partially heated water from line 42 and discharges the further heated water through line 56. The heated water is thus brought to a higher temperature by the recovery of some of the heat content of the boiler flue gases.

In the application of the present heat recovery fluid, bis-phenoxy biphenyl, the temperature of the gas stream entering the heat recovery unit is 381° F. with the gas flow amounting to 275,000 lb. per hour. The gas stream leaving the first tower is at a temperature of 145° F. while the gas temperature at the exit of the second tower is 100° F. The high temperature tower uses the synthetic organic medium described above, entering at the rate of 460,000 lb. per hour at a temperature of 145° F., and leaving the first tower at 245° F. In the second tower the heat recovery medium is water entering at the rate of 207,000 lb. per hour at a temperature of 50° F. The water leaving the second tower then goes to an indirect heat exchanger where it is increased from a temperature of 135° F. (corresponding to the heat content pick up in the first tower). The water then going through the heat exchanger leaves at a final temperature of 213° F.

Analysis of the recovery in the above system shows an improvement corresponding to an increase of 15.1% in the net steam output from the boiler plant for the same amount of fuel consumed. For the same net boiler plant steam output as the conventional system, a reduction in fuel consumption 11.6% is achieved.

As another specific example of the operation of the two fluid heat transfer system employing the present organic medium, bis-phenoxy biphenyl, and with water employed in a direct contact vessel with such medium, the following conditions indicate the amount of heat recovered in the system of FIGURE 3. In this dual unit, the hot gases enter from duct 60 into the primary contacting tower 61 at the rate of 116,000 lb. per hour at a temperature of 400° F. The tower is provided with liquid trap and withdrawal means, 64 and 65. Upon passage through the first level of the tower, the exiting gases pass through the water spray tower 62, finally emerging at the top of the tower 63 at a temperature of 116° F. The synthetic organic medium from line 70 enters the lower portion 61 of the tower at 140° F. at the rate of 111,000 lb. per hour, and leaves the tower at 300° F. by line 71 and pump 72. The heat acceptor fluid in this example is boiler feedwater which enters by line 80 into the top level of 62 of the spray tower at a temperature of 60° F. and at the rate of 94,000 lb. per hour. This stream leaves the lower portion of the tower 62 (having traps 65), by line 81 and pump 82 at a temperature of 135° F. An advantage of the dual contacting is that the water spray tower also functions to recover the organic medium which might otherwise be carried upwards from the first level. The further heating of the boiler feedwater takes place in a direct contact heat exchanger 90 which is a vertical tank having one liquid as the continuous phase, and the other liquid dispersed therein. For example the synthetic organic medium flows downward, countercurrent to the upward flow of the feedwater. The feedwater from line 83 enters this tower at a temperature of 135° F. having been increased in temperature as described above. After being further heated in the direct contact heat exchanger, the boiler feedwater leaves by line 94 and pump 95 at a temperature of 210° F. The synthetic organic medium from line 73 imparting heat to the water enters this heat exchanger at a temperature of 300° F. (the temperature at which this medium left the lower portion of the gas tower). The synthetic organic medium leaves the direct contact heat exchanger by line 92 and pump 93 at a temperature at 140° F. and at the rate of 152,000 lb. per hour, and is then recycled.

In addition to the use of direct and indirect heat exchange, combinations of such systems are also a part of the present invention, for example, by first passing the synthetic organic medium through a shell and tube heat exchanger, followed by a direct contact heat exchanger.

Analysis of the recovery in the above system shows an improvement corresponding to an increase of 15.5% in the net steam output from the boiler plant. For the same net boiler plant steam output as the conventional system, a reduction in fuel output of 13.5% is achieved.

What is claimed is:

1. Process for the recovery of heat from hot gases which comprises passing the said hot gases into direct contact with a stream comprising a polyphenyl ether having from 4 to 6 benzene radicals joined by oxygen ether linkages raising the temperature and heat content of the said polyphenyl ether by heat exchange from the said gas, and thereafter removing heat from the said polyphenyl ether.

2. Process for the recovery of heat from hot gases which comprises passing the said hot gases into direct contact with a falling stream of droplets of a polyphenyl ether having from 4 to 6 benzene radicals joined by oxygen ether linkages whereby the temperature and heat content of the said polyphenyl ether is increased, and thereafter recovering the heat content of the said polyphenyl ether by passing the same in contact with a stream of an inert fluid.

3. Process for recovering heat from a stream of boiler flue gas which comprises passing the said gas countercurrent to a falling stream of droplets of a polyphenyl ether having from 4 to 6 benzene radicals joined by oxygen ether linkages increasing the temperature of the said polyphenyl ether by such contacting and thereafter recovering heat from the said polyphenyl ether.

4. Process for recovering heat from a stream of boiler flue gases which comprises first contacting the said rising stream of flue gas with a falling stream of droplets of a polyphenyl ether having from 4 to 6 benzene radicals joined by oxygen ether linkages heating the said polyphenyl ether radicals by absorbing heat from the said flue gases, passing the said heated polyphenyl ether to a heat exchanger, passing flue gases which have gone through the first contacting described above to a second contacting zone in which such flue gas is contacted with a falling stream of droplets of water, heating the said water by absorption of at least some of the heat of the said flue gas stream, withdrawing the said heated water from the said contacting zone, and thereafter passing such heated water through the aforementioned heat exchanger and imparting additional heat to the said water from the polyphenyl ether therein.

References Cited by the Examiner

UNITED STATES PATENTS 2,838,135   6/1958   Pilo et al. _____ 261—151 X
3,006,852   10/1961  Barnum et al. _____ 252—73 X ROBERT A. O'LEARY, *Primary Examiner.*

CHARLES SUKALO, *Examiner.*

FREDERICK L. MATTESON, JR., M. A. ANTONAKAS, *Assistant Examiners.*